No. 856,992. PATENTED JUNE 11, 1907.
R. R. SPEARS.
PISTON PACKING.
APPLICATION FILED NOV. 30, 1906.

Ralph R. Spears, Inventor

Witnesses

UNITED STATES PATENT OFFICE.

RALPH R. SPEARS, OF WHEELING, WEST VIRGINIA.

PISTON-PACKING.

No. 856,992. Specification of Letters Patent. Patented June 11, 1907.

Original application filed June 14, 1906, Serial No. 321,674. Divided and this application filed November 30, 1906. Serial No. 345,714.

*To all whom it may concern:*

Be it known that I, RALPH R. SPEARS, a citizen of the United States, residing at Wheeling, in the county of Ohio and State of West Virginia, have invented a new and useful Piston-Packing, of which the following is a specification.

This invention relates more particularly to packing for pistons in that type of motors wherein the motive fluid is alternately supplied to and exhausted from the cylinder on opposite sides of the piston, though the said invention is, perhaps, useful in other relations.

The present application is a division of copending application, Serial No. 321,674.

The principal object is to provide a piston packing wherein the danger of leakage past the piston is reduced to a minimum and the wear of the parts is automatically compensated for.

Figure 1:
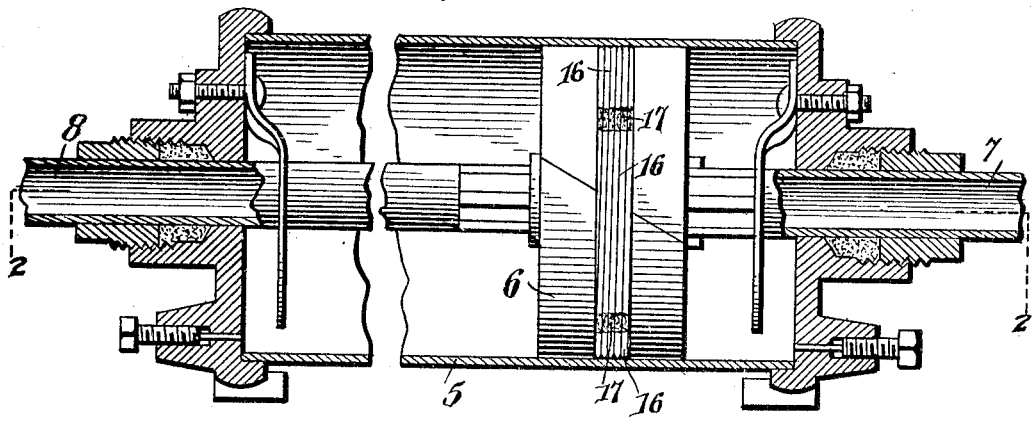
Figure 2:
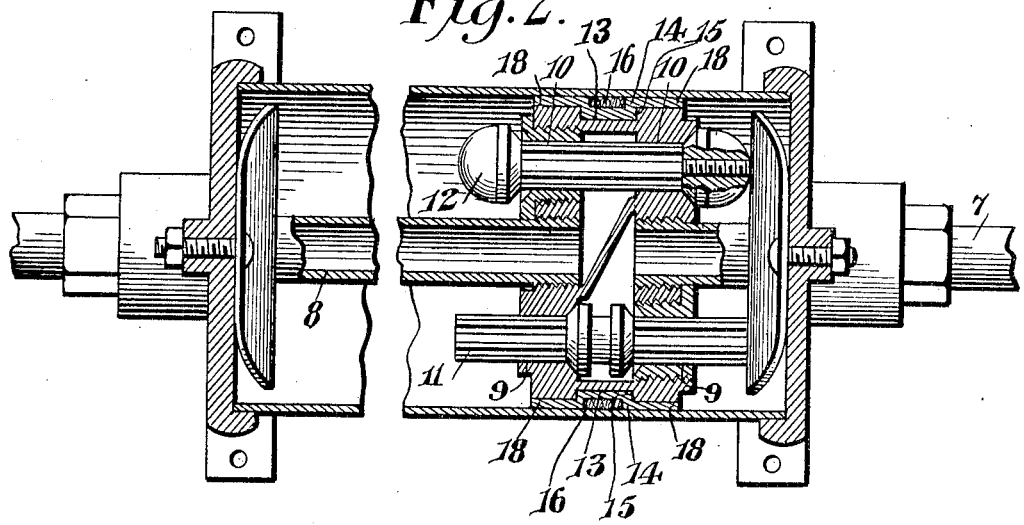
Figure 3:
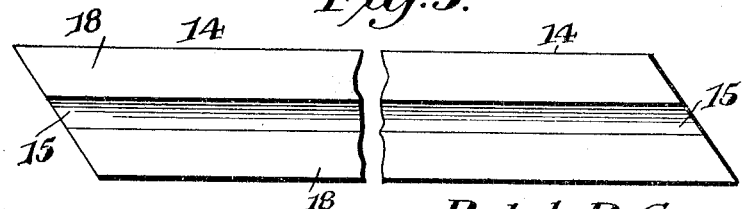
Figure 4:
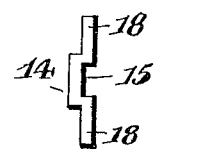

The preferred form of construction is illustrated in the accompanying drawings, wherein Figure 1 is a sectional view through a motor with the piston shown in elevation and provided with the novel packing; Fig. 2 is a sectional view on the line 2—2 of Fig. 1; Fig. 3 is a detail plan view of the annular packing band; Fig. 4 is an end view of the same.

Similar reference numerals designate corresponding parts in all the figures of the drawings.

In order that the application of the novel structure may be clearly understood, the same is shown in place in a motor which constitutes the subject-matter of the aforementioned co-pending application.

Briefly described, this motor consists of a cylinder 5, in which operates a reciprocatory piston 6, provided with a piston rod in the form of tubes or pipes 7 and 8 that extend through opposite heads of the cylinder and constitute, respectively, supply and exhaust pipes. These pipes are in communication with the cylinder on opposite sides of the piston through ports 9 and 10 controlled, respectively, by valve mechanisms 11 and 12, as fully set forth in the said co-pending application. Inasmuch as the pressure is alternately upon opposite sides of the piston, it is necessary to provide against leakage past the piston in both directions. The following novel means has proven highly effective for the purpose.

The piston 9 is of less diameter than the cylinder and is provided in its periphery with an annular groove 13. A band 14 of leather or other flexible material surrounds the piston and has an intermediate in-set portion 15 seated in the groove 13. Retaining wire 16 is wrapped into a plurality of convolutions around the in-set portion 15, the wire being held against unwrapping by soldering the convolutions together at suitable intervals, as shown at 17 in Fig. 1. The marginal portions 18 of the band are free and constitute, in effect, extensible flaps that will freely spread, and thus at all times co-operate with the cylindrical wall of the cylinder. The abutting ends of the band are cut diagonally, as shown in Figs. 1 and 3.

Experience has demonstrated that in mechanism of this type, the nearer the well-known cup packing can be approached, the less liability there is of leakage, but inasmuch as the valve mechanisms 11 and 12 project through the opposite sides of the piston, cup packings cannot be employed. The structure disclosed, however, has practically all the advantages of cup packings for the oppositely extending margins of the band or ring are free so that the motive fluid can enter between them and the piston body, thus forcing them outwardly and insuring a tight joint during the opposite movements of the piston and without regard to the wear of the parts.

Having thus fully described my invention, what I claim as new, and desire to secure by Letters Patent, is:—

1. In mechanism of the character set forth, the combination with a cylinder, of a reciprocatory piston operating therein and having an annular groove in its periphery, a band of flexible material surrounding the periphery of the piston, said band having its intermediate portion located in the groove and of less thickness than the depth of said groove, and its side margins free and disposed on opposite sides thereof, and means extending around the outside of the said intermediate portion of the band and located in the groove of the piston to maintain said portion therein.

2. In mechanism of the character set forth, the combination with a cylinder, of a reciprocatory piston operating therein, and having an annular groove in its periphery a band of flexible material surrounding the piston, said band having an intermediate inset portion located in the groove of the piston and having its side margins free and projecting beyond the opposite sides of said inset portion, and a wire wound into a series of convolutions around the said inset portions of the band, said wire being located in the groove and having its several convolutions soldered together.

In testimony, that I claim the foregoing as my own, I have hereto affixed my signature in the presence of two witnesses.

RALPH R. SPEARS.

Witnesses:
   LAVINIA M. CARROLL,
   MAUDE E. MURRIN.